US008369253B2

(12) United States Patent
Faccin et al.

(10) Patent No.: US 8,369,253 B2
(45) Date of Patent: Feb. 5, 2013

(54) METHODS AND APPARATUS TO SUPPORT VOICE SOLUTIONS FOR DATA CENTRIC TERMINALS

(75) Inventors: Stefano Faccin, Hayward, CA (US); Claude Jean-Frederic Arzelier, Slough (GB); Jan Hendrik Lucas Bakker, Irving, TX (US)

(73) Assignee: Research In Motion Limited, Waterloo (CA)

( * ) Notice: Subject to any disclaimer, the term of this patent is extended or adjusted under 35 U.S.C. 154(b) by 329 days.

(21) Appl. No.: 12/856,270

(22) Filed: Aug. 13, 2010

(65) Prior Publication Data

US 2011/0194505 A1 Aug. 11, 2011

Related U.S. Application Data

(60) Provisional application No. 61/234,216, filed on Aug. 14, 2009.

(51) Int. Cl.
 *H04B 7/00* (2006.01)
(52) U.S. Cl. ..................... 370/310.2; 370/230
(58) Field of Classification Search .................. 370/217, 370/219, 220, 221, 351, 352–358
See application file for complete search history.

(56) References Cited

U.S. PATENT DOCUMENTS

| 2010/0302937 A1* | 12/2010 | Hu et al. ................ 370/225 |
| 2012/0170503 A1* | 7/2012 | Kelley et al. ............ 370/312 |

OTHER PUBLICATIONS

Patent Cooperation Treaty, International Preliminary Report on Patentablity, issued for patent application serial No. PCT/US2010/045452, mailed on Feb. 23, 2012, 12 pages.

Patent Cooperation Treaty, International Search Report and Written Opinion, issued for patent application serial No. PCT/US2010/045452, mailed on Nov. 19, 2010, 18 pages.
Research in Motion UK Limited: "SMS over SGs and provisioning of CS fallback services to Data Centric UEs"; 3GPP Draft; C1-093566, 3rd Generation Partnership Project (3GPP); Change Request; 3GPP TSG-CT EG1 Meeting #60; Sevilla, Spain; Aug. 24-28, 2009; 17 pages.
Research in Motion UK Limited: "SMS over SGs and provisioning of CSFB services to Data Centric UEs"; 3GPP Draft; C1-093565; 3rd Generation Partnership Project (3GPP); Agenda Item 9.2.1; 3GPP TSG CT WG1 Meeting #60; Sevilla, Spain; Aug. 24-28, 2009; 6 pages.
ALU: "SMS over LTE: Coexistence of CSFB with SMSoIP for SMS, and CSFB optimized solution for data cards"; 3GPP Draft; S2-094475; 3rd Generation Partnership Project (3GPP); Agenda Item 7.6.1; 3GPP TSG SA WG2 Meeting #74; Sophia Antipolis, France; Jul. 6-10, 2009; 3 pages.
Alcatel-Lucent: "SMS over SGs for data only UE's"; 3GPP Draft; S2-094857; 3rd Generation Partnership Progect (3GPP); Change Request; 3GPP TSG-SA WG2 Meeting #74; Sophia Antipolis, France; Jul. 6-10, 2009; 5 pages.
3rd Generation Partnership Project; Technical Specification Group Services and System Aspects; Circuit Switched Fallback in Evolved Packet System; Stage 2 (Release 8); 3GPP Standard; 3GPP TS 23.272, Valbonne, France, V8.4.0, Jun. 2009, 48 pages.
3rd Generation Partnership Project; Technical Specification Group Services and System Aspects; Architectural requirements (Release 8); 3GPP Standard; 3GPP TS 23.221, Valbonne, France, V8.4.0, Jun. 2009, 46 pages.

(Continued)

*Primary Examiner* — Brenda H Pham

(74) *Attorney, Agent, or Firm* — Hanley, Flight & Zimmerman, LLC

(57) ABSTRACT

Methods and apparatus to support voice solutions for data centric terminals are described. An example method includes sending a combined registration request message for at least one evolved packet system service via a first radio access technology, receiving an EPS service registration accept message comprising an indicator that indicates that circuit switched fall back is supported, and when the user equipment has a voice centric setting, reselecting to a second radio access technology.

18 Claims, 11 Drawing Sheets

OTHER PUBLICATIONS

3rd Generation Partnership Project; Technical Specification Group Core Network and Terminals; Non-Access-Statum (NAS) protocol for Evolved Packet System (EPS); Stage 3 (Release 8); 3GPP Standard; 3GPP TS 24.301, Valbonne, France, V8.3.0, Sep. 2009, 267 pages.

3rd Generation Partnership Project; Technical Specification Group Core Network and Terminals; Non-Access-Statum (NAS) protocol for Evolved Packet System (EPS); Stage 3 (Release 8); 3GPP Standard; 3GPP TS 24.301, Valbonne, France, V8.4.0, Dec. 2009, 275 pages.

Ericsson, ST-Ericsson; "SMS Over SGs" 3GPP Draft; S2-094861_CR-0112; 3rd Generation Partnership Project (3GPP), Sophia-Antipolis, France; 3GPP TSG-SA WG2 Meeting #74, Jul. 2009, 16 pages.

Alcatel-Lucent; "SMS Over SGs for data only UEs" 3GPP Draft; S2-094958_CR-110; 3rd Generation Partnership Project (3GPP), Sophia-Antipolis, France; 3GPP TSG-SA WG2 Meeting #74, Jul. 2009, 18 pages.

Alcatel-Lucent; "SMS Over SGs for data only UEs" 3GPP Draft; S2-094959_CR-111; 3rd Generation Partnership Project (3GPP), Sophia-Antipolis, France; 3GPP TSG-SA WG2 Meeting #74, Jul. 2009, 18 pages.

Ericsson, ST-Ericsson; "SMS Over SGs" 3GPP Draft; S2-094861_CR-0097; 3rd Generation Partnership Project (3GPP), Sophia-Antipolis, France; 3GPP TSG-SA WG2 Meeting #74, Jul. 2009, 14 pages.

* cited by examiner

US 8,369,253 B2

METHODS AND APPARATUS TO SUPPORT VOICE SOLUTIONS FOR DATA CENTRIC TERMINALS

RELATED APPLICATIONS

This patent claims the benefit of U.S. Provisional Patent Application Ser. No. 61/234,216, filed on Aug. 14, 2009, and entitled "METHODS AND APPARATUS TO SUPPORT VOICE SOLUTIONS FOR DATA CENTRIC TERMINALS." The disclosure of U.S. Provisional Patent Application Ser. No. 61/234,216 is hereby incorporated by reference herein in its entirety.

FIELD OF THE DISCLOSURE

This disclosure relates generally to mobile communications and, more particularly, to methods and apparatus to support voice solutions for data centric terminals.

BACKGROUND

Mobile user equipment (UE) can be provisioned to be data centric or voice centric. In addition, mobile UEs can include a voice setting (e.g., internet protocol (IP) multimedia subsystem (IMS) preferred, circuit switched (CS) secondary). These settings control how a UE accesses CS voice services through circuit switched fallback (CSFB). For example, when a UE sends a combined registration request for evolved packet system (EPS) and non-EPS services (e.g., an ATTACH request or a TRACKING AREA UPDATE request) to a long term evolution (LTE) network, the network may indicate that the combined registration failed. Typically, a voice centric UE will reselect to a second generation (2G) or third generation (3G) radio access technology (RAT). In contrast, a data centric UE will remain on the LTE network without using any voice solutions. The data centric UE will not be paged or will ignore pages while camped on LTE even though a network may support providing voice services through IMS and/or CSFB.

DETAILED DESCRIPTION

Figure 1:
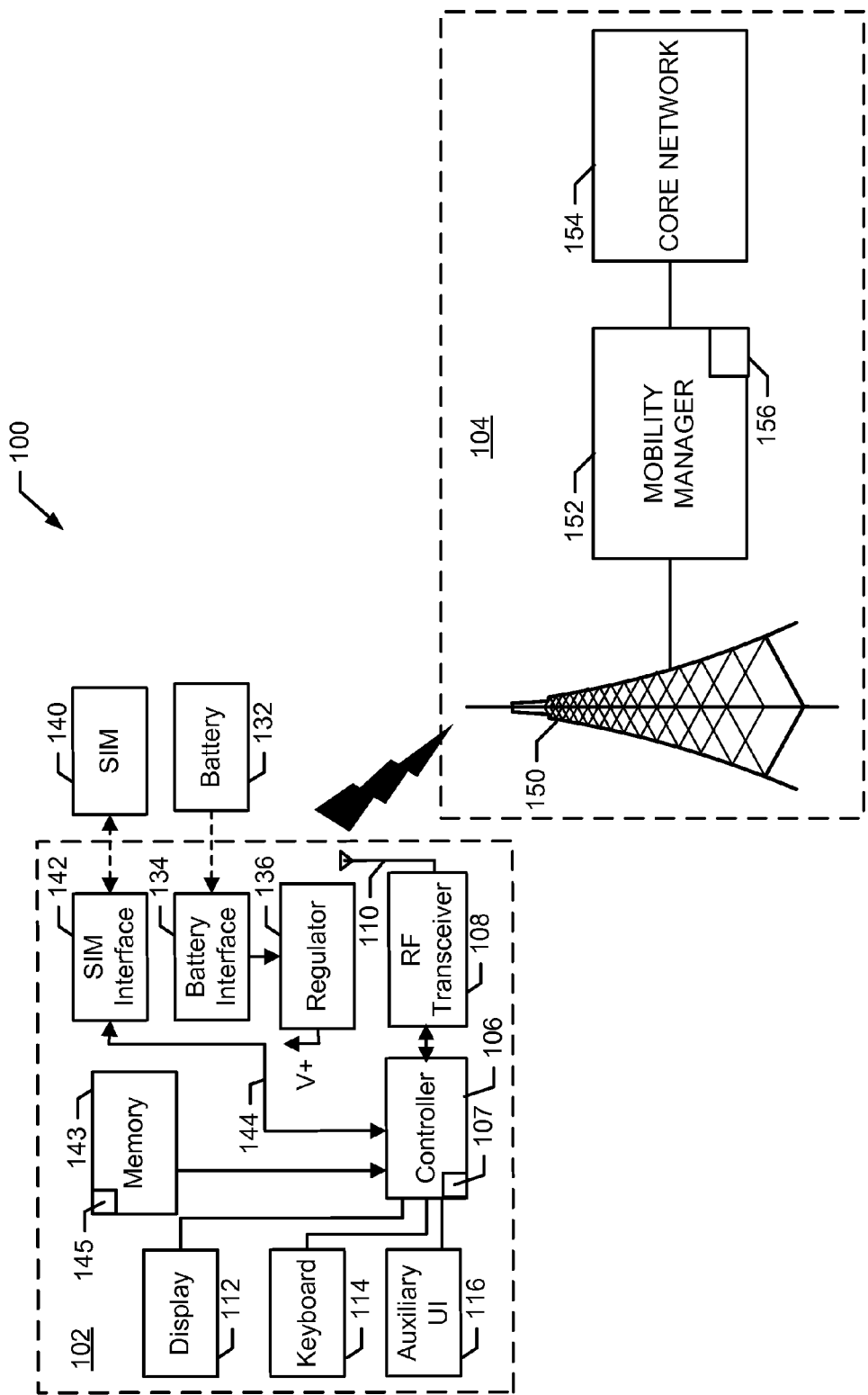
FIG. 1 is a block diagram of an example communication system.

In FIG. 1, a block diagram of an example communication system 100 implemented as described herein to support voice solutions for data centric terminals. According to an illustrated example, user equipment (UE) 102 communicates with a wireless communication network 104. The communication network 104 exchanges many indications with the UE 102 regarding the state of the communication network 104 and the connection between the UE 102 and the communication network 104. Such messages include, for example, requests for the UE 102 to attach to the communication network 104 or requests for the UE 102 to perform a tracking area update (TAU) to the communication network 104. Additionally, such exchanges may provide indications of available services, such as an indication that voice services are not available, but a short message service (SMS) is available (such an indication takes the form of an SMS Only Indication). Additionally, such messages may provide, for example, indications that circuit switched fallback (CSFB) service is available.

As described in detail in conjunction with the provided examples, the communication network 104 provides to the UE 102 a separate indication or multiple indications (in addition to the SMS Only Indication) regarding which services are available. These indications may affect the behavior of the UE 102, which may respond by, for example, making voice services available via a circuit switched (CS) connection, such as CSFB, to a data centric (DC) UE camped on a long term evolution (LTE) connection, while not allowing a voice centric (VC) UE to use the CS network for voice services. In this manner, the additional information provided by the communication network 104 can affect the operation of the UE 104 in a desired manner based on the usage information of the UE (e.g., voice centric or data centric).

As described below in detail, the additional separate indication provided by the communication network 104 to the UE 102 can be a binary indication if referring to a single service (e.g. the indication can be a CSFB Supported Indication to tell the UE 102 whether CSFB is supported or not for a DC UE camping in LTE) or have multiple values (e.g. CSFB supported, Unstructured Supplementary Service Data (USSD) supported, CS video, both USSD and CS video supported, etc.). The latter can be referred to as UE Service indication. The following description refers to a CSFB Supported Indication, but such references represent both the case of an additional separate binary indication and the case of an additional separate UE Service indication. Additionally, though the specific example of CSFB service is described in the following examples, the following applies to other services (e.g., USSD) and to the indication of one or more services as well. The additional separate indication can be, as an example, provided upon combined registration, wherein both a packet switch (PS) service and a circuit switched (CS) service are made available to the UE 102 (i.e., a Combined IMSI/evolved packet system (EPS) Attach or Combined IMSI/EPS Tracking Area Update (TAU)).

Alternatively, as described below, the network 104 may provide to the UE 102 an SMS only and CSFB Supported Indication, meaning that both SMS and CSFB are supported. The SMS only and CSFB Supported Indication is a new indication that may be sent as an alternative to the SMS Only Indication that presently exists. In the following description, the CSFB Supported Indication is used to represent either an additional separate indication of the services, or the SMS only and CSFB Supported Indication. SMS only is a subset of non-EPS services that includes only SMS. A UE camping on evolved universal mobile telecommunications system (UMTS) radio access network (UTRAN) (E-UTRAN) can attach to both EPS services and SMS only.

Although example operation of the UE 102 and the communication network 104 are provided below in conjunction with example use cases, the signaling between the UE 102 and the communication network 104 is briefly described below with reference to three scenarios. In each of the three scenarios described below, the CSFB Supported Indication informs the UE 102 that CSFB is available for DC UEs, but not for VC UEs and that VC UEs should ignore such CSFB Supported Indication. Thus, the DC UEs can remain camped on LTE services and receive voice connectivity from the CS network via CSFB, if needed, but VC UEs would reselect to another service provided to obtain voice services. While the examples provided herein refer to the communication network 104 providing sufficient information to the UE 102 regarding the fact that a DC UE can also have access to CSFB when camping in LTE, other uses of augmented information exist. That is, more generically, augmented information can be provided from the communication network 104 to the UE 102 to provide sufficient information to the UE 102 regarding the fact that a DC UE can also have access to other services (e.g., USSD) when camping in LTE. These other services may now be part of CSFB per 3GPP definitions, but may be considered separate and provided separately from the provisioning of full CSFB. As used herein, the CSFB Supported Indication can be a new information element (IE), a new value (code-point) within an already existing IE, or a new value (code-point) within a new IE. For example, the CSFB and SMS services can be communicated as part of an octet of EPS attach results or EPS update results.

An example ATTACH REQUEST message with an Additional update type IE for specifying whether the request is a combined request or an SMS only request is shown in Table 1:

TABLE 1

ATTACH REQUEST with Additional update type IE

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Attach request message identity | Message type 9.8 | M | V | 1 |
|  | EPS attach type | EPS attach type 9.9.3.11 | M | V | ½ |
|  | NAS key set identifier | NAS key set identifier 9.9.3.21 | M | V | ½ |
|  | Old GUTI or IMSI | EPS mobile identity 9.9.3.12 | M | LV | 5-12 |
|  | UE network capability | UE network capability 9.9.3.34 | M | LV | 3-14 |
|  | ESM message container | ESM message container 9.9.3.15 | M | LV-E | 2-n |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |

In an example implementation, the Additional update type IE may be populated with bits that indicate the type of the request. The example Additional update type is a type 1 information element. For example, bit 1 may be a 0 to indicate no additional information, which indicates that the request shall be interpreted as a request for combined attach. Bit 1 may be a 1 to indicate that the request is for SMS only. In the example, its 4 to 2 of octet 1 are spare and shall be all coded as zero.

An example TRACKING AREA UPDATE REQUEST message with an Additional update type IE for specifying whether the request is a combined request or an SMS only request is shown in Table 2:

TABLE 2

TRACKING AREA UPDATE REQUEST with Additional update type IE

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Tracking area update request message identity | Message type 9.8 | M | V | 1 |
|  | EPS update type | EPS update type 9.9.3.14 | M | V | ½ |
|  | NAS key set identifier | NAS key set identifier 9.9.3.21 | M | V | ½ |
|  | Old GUTI | EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |
| A- | UE radio capability information update needed | UE radio capability information update needed 9.9.3.35 | O | TV | 1 |
| 57 | EPS bearer context status | EPS bearer context status 9.9.2.1 | O | TLV | 4 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |

In an example implementation, the Additional update type IE may be populated with bits that indicate the type of the request. The example Additional update type is a type 1 information element. For example, bit 1 may be a 0 to indicate no additional information, which indicates that the request shall be interpreted as a request for combined tracking area update. Bit 1 may be a 1 to indicate that the request is for SMS only. In the example, its 4 to 2 of octet 1 are spare and shall be all coded as zero.

An example ATTACH ACCEPT message with an Additional update result IE for specifying additional information about the result of a combined attach procedure if the procedure was successful for EPS services and non-EPS services, or for EPS services and SMS only is shown in Table 3:

TABLE 3

ATTACH ACCEPT with Additional update result IE

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Attach accept message identity | Message type 9.8 | M | V | 1 |
|  | EPS attach result | EPS attach result 9.9.3.10 | M | V | ½ |

TABLE 3-continued

ATTACH ACCEPT with Additional update result IE

| IEI | Information Element | Type/Reference | Presence | Format | Length |
|---|---|---|---|---|---|
|  | Spare half octet | Spare half octet 9.9.2.9 | M | V | ½ |
|  | T3412 value | GPRS timer 9.9.3.16 | M | V | 1 |
|  | TAI list | Tracking area identity list 9.9.3.33 | M | LV | 7-97 |
|  | ESM message container | ESM message container 9.9.3.15 | M | LV-E | 2-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |

In an example implementation, the Additional update result IE may be populated with bits that indicate additional information about the result of a combined attached procedure. The example Additional update result is a type 1 information element. For example, the bits of the Additional update result IE may be set as shown in Table 4:

TABLE 4

Additional update result IE example parameters
Additional update result value (octet 1)

| Bits | | |
|---|---|---|
| 2 | 1 | |
| 0 | 0 | no additional information |
| 0 | 1 | CS Fallback not preferred |
| 1 | 0 | SMS only |
| 1 | 1 | reserved |

Bits 4 and 3 of octet 1 are spare and shall all be coded as zero.

An example TRACKING AREA UPDATE ACCEPT message with an Additional update result IE for specifying additional information about the result of a combined attach procedure if the procedure was successful for EPS services and non-EPS services, or for EPS services and SMS only is shown in Table 5:

TABLE 5

TRACKING AREA UPDATE ACCEPT with Additional update result IE

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Tracking area update accept message identity | Message type 9.8 | M | V | 1 |
|  | EPS update result | EPS update result 9.9.3.13 | M | V | ½ |
|  | Spare half octet | Spare half octet 9.9.2.9 | M | V | ½ |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |

TABLE 5-continued

TRACKING AREA UPDATE ACCEPT with Additional update result IE

| IEI | Information Element | Type/Reference | Presence | Format | Length |
| --- | --- | --- | --- | --- | --- |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |

In an example implementation, the Additional update result IE may be populated with bits that indicate additional information about the result of a combined tracking area update procedure. The example Additional update result is a type 1 information element. For example, the bits of the Additional update result IE may be set as shown in Table 4.

In a first scenario, when the UE 102 requests a Combined Attach/TAU requesting SMS only services (i.e., a Combined Attach/TAU Request with SMS Only Indication in, for example, an Additional update type IE of the request) and the communication network 104 is configured to provide CSFB services to DC UEs, the network 104 returns to the UE 102 a Combined Attach/TAU Accept message that is augmented with the CSFB Supported Indication. Again, in this scenario, the CSFB Supported Indication provides an indication to the UE 102 that DC UEs are allowed to use of CSFB for voice service, while VC UEs will have access only to SMS and, therefore, would reselect to another RAT.

In a second scenario, the UE 102 requests a Combined Attach/TAU, but receives from the communication network 104, a Combined Attach/TAU Accept with indication of SMS only (i.e., not the second scenario where the UE sent a combined registration request indicating SMS only, but a scenario in which the communication network 104 is configured to provide CSFB services to DC UEs and the communication network 104 provides an indication that SMS is the only service available to the UE 102) is augmented with the CSFB Supported Indication provided to the UE 102. This CSFB Supported Indication indicates to the UE 102 that DC UEs are allowed to use of CSFB for voice service, but VC UEs are not.

In one example, the UE 102 includes a visual display 112, a keyboard 114, and perhaps one or more auxiliary user interfaces (UI) 116, each of which are coupled to a controller 106. The controller 106 is also coupled to a radio frequency (RF) transceiver circuitry 108, which is further coupled to an antenna 110. In one example, the controller 106 is implemented using a central processing unit (CPU) that runs operating system software stored in a memory 143. The controller 106 will normally control overall operation of UE 102, whereas signal processing operations associated with communication functions are typically performed by the RF transceiver circuitry 108. The controller 106 interfaces with the display 112 to present received information, stored information, user inputs, and the like.

The example controller 106 includes a voice support manager (VSM) 107 that manages the provision of voice services to the UE 102. For example, in addition to other functionality, the VSM 107 may process messages and indications received from the communication network 104 to provide CS voice functionality if the UE 102 is configured as a DC UE, whereas the VSM 107 causes the UE 102 to reselect another radio access technology (RAT) (e.g., 2G or 3G) if the UE 102 is configured as a VC UE. Example methods and apparatus to implement the VSM 107 are described below in conjunction with the figures.

The keyboard 114, which may be a telephone type keypad or full alphanumeric keyboard, is normally provided for entering data for storage in the UE 102, information for transmission to the network 104, a telephone number to place a telephone call, commands to be executed on the UE 102, and possibly other or different user inputs.

The UE 102 sends communication signals to, and receives communication signals from the communication network 104 over a wireless link via the antenna 110. The RF transceiver circuitry 108 performs, for example, modulation/demodulation, encoding/decoding, and encryption/decryption. The RF transceiver circuitry 108 is adapted to particular wireless network or networks in which UE 102 may operate.

The UE 102 further includes a battery interface 134 to receive one or more rechargeable batteries 132. The battery 132 provides power to electrical circuitry in UE 102, and the battery interface 134 provides for a mechanical and electrical connection for the battery 132. The battery interface 134 is coupled to a regulator 136 that regulates power V+ to the device. When the UE 102 is operational, an RF transmitter of the RF transceiver circuitry 108 is typically keyed or turned on only when it is sending information to the network, and is otherwise turned off to conserve resources. Similarly, an RF receiver of the RF transceiver circuitry 108 is typically periodically turned off to conserve power until it is needed to receive signals or information (if at all) during designated time periods.

The UE 102 operates using a Subscriber Identity Module (SIM) 140 that is connected to or inserted in the UE 102 at a SIM interface 142. Without the SIM 140, the UE 102 may be referred to as mobile equipment (ME). The SIM 140 is one type of a removable memory module or smart card used to identify an end user of UE 102 (or subscriber) and to personalize the device, among other things. Without the SIM 140, the example UE 102 is not fully operational for communication through the wireless communication network 104. By inserting the SIM 140 into the UE 102, an end user can have access to any and all of his/her subscribed services.

The SIM 140 generally includes a processor and memory for storing information. Because the SIM 140 is coupled to the SIM interface 142, it is coupled to the controller 106 through communication lines 144. To identify the subscriber, the SIM 140 contains some user parameters such as an International Mobile Subscriber Identity (IMSI). An advantage of using the SIM 140 is that end users are not necessarily bound by any single physical mobile station because the SIM 140 may be used in any number of different mobile stations. The SIM 140 may store additional user information for the UE 102 as well, including datebook (or calendar) information, recent call information, and network connection information.

The UE 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the UE 102 may be a multiple-module unit comprising a plurality of separate components, including but in no way limited to a computer or other device connected to a wireless modem. In particular, for example, in the mobile station block diagram of FIG. 1, the RF transceiver circuitry 108 and antenna 110 may be implemented as a radio modem unit that may be inserted into a port on a laptop computer. In this case, the laptop computer would include the display 112, keyboard 114, one or more auxiliary UIs 116, and the controller 106 may be the computer's CPU. A computer or other equipment not normally capable of wireless communication may be adapted to connect to and effectively assume control of the RF transceiver circuitry 108 and the antenna 110 of a single-unit device such as one of those described above.

The UE 102 communicates in and through the communication network 104, which may be a cellular telecommunications network. In the example of FIG. 1, the wireless network 104 is configured in accordance with the LTE technology, but may also provide other services using CS technology. The wireless network 104 may be configured according to any communication technology including, for example, universal mobile telecommunications system (UMTS), worldwide interoperability for microwave access (WiMAX), code division multiple access (CDMA), General Packet Radio Service (GPRS), Global Systems for Mobile (GSM), enhanced data rates for GSM evolution (EDGE), GSM EDGE (GERAN), etc.

The wireless communication network 104 includes a base transceiver station 150, a mobility manager 152 that includes a connection manager (CM) 156, and a core network 154.

The base transceiver station 150 is a fixed transceiver station, and the base transceiver station 150 may be referred to as transceiver equipment. The transceiver equipment includes for example, an antenna and a transceiver station node such as, for example an enhanced Node B (eNode B) in an LTE implementation, a Node B and/or a radio network controller (RNC) in a UMTS implementation, a base transceiver station (BTS) and/or a base station controller (BSC) in a GERAN implementation, etc. The transceiver equipment provides wireless network coverage for a particular coverage area commonly referred to as a cell. A group of cells may form a location area (LA), a tracking area (TA) or a routing area (RA). The transceiver equipment transmits communication signals to, and receives communication signals from, the UE 102 within its cell via base transceiver station 150. The transceiver equipment normally performs such functions as modulation and possibly encoding and/or encryption of signals to be transmitted to the UE 102 in accordance with particular, usually predetermined, communication protocols and parameters, under control of its controller. The transceiver equipment similarly demodulates and possibly decodes and decrypts, if necessary, any communication signals received from UE 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between the wireless network 104 and the UE 102. An RF channel is a limited resource that must be conserved, typically due to limits in overall bandwidth and a limited battery power of the UE 102. A wireless network may include hundreds of cells, each served by a base transceiver station 150 (i.e. or station sector), depending upon desired overall expanse of network coverage. All pertinent components may be connected by multiple switches and routers (not shown), controlled by multiple network controllers.

The connection mobility manager 152 manages communications between the UE 102 (via the base transceiver station 150) and the core network 154. For example, the mobility manager 152 manages signaling, tracking, and paging of the UE 102, activation and deactivation of radio bearers for the UE 102, authentication of a user of the UE 102, etc. The mobility manager 152 of the illustrated example is a mobility management entity (MME) for an LTE network. However, the mobility manager 152 may be any type of mobility manager such as, for example, a serving GPRS support node (SGSN) for a UMTS, etc.

The example mobility manager 152 includes the CM 156 to manage connections between the core network 154 and the UE 102. The CM 156 provides augmented information (e.g., the CSFB Supported Indication) to the UE 102, which, as described below, allows the UE 102 remain camped on LTE and use CS services (e.g., CSFB) to obtain voice service if the UE 102 is a DC UE. As described below in detail, a VC UE does not process the CSFB Supported Indication, but the receipt of an SMS only indication by a VC UE will cause the UE to reselect to a different RAT. Example methods and apparatus to implement the CM 156 are described below in conjunction with the drawings.

The core network 154 of the illustrated example is the central part of the wireless communication network 104 that provides services to the UE 102 via the mobility manager 152 and the base transceiver station 150. For example, the core network 154 may support one or more of VoIMS, VoLGA, packet switched (PS) communications, circuit switched (CS) communications, etc. The core network 154 may include any components needed for providing such services such as components for authentication, gateways to other networks, communication control and switching components, accounting components, service invocation and management components, etc.

In operation, the UE 102 makes its presence known to wireless network 104 by performing an Attach operation.

This operation establishes a logical link between the UE 102 and the CM 156 and makes the UE 102 available to receive, for example, pages via the CM 156, notifications of incoming data, SMS messages, etc. The Attach operation may be a non-combined Attach in which the UE 102 requests only PS services or CS services. Alternatively, the Attach operation may be a combined Attach in which the UE 102 requests both PS services and CS services. In order to send and receive data, the UE 102 assists in activating a packet data address that it wants to use. This operation makes UE 102 known to a packet gateway within the core network 154; interworking with external data networks can thereafter commence. User data may be transferred transparently between the UE 102 and the external data networks using, for example, encapsulation and tunneling.

A wireless network may be connected to other systems, possibly including other networks, not explicitly shown in FIG. 1. A network may transmit some sort of paging and system information on an ongoing basis, even if there is no actual packet data exchanged. Although the network consists of many parts, these parts all work together to result in certain behaviors at the wireless link.

Block diagrams of apparatus and flowcharts representative of example processes that may be executed to implement some or all of the elements of the system 100 and mobile communication devices described herein are described below and shown in the drawings.

In these examples, the process represented by each flowchart may be implemented by one or more programs comprising machine readable instructions for execution by: (a) a processor, such as the microprocessor 1112 shown in the example computer system 1100 discussed below in connection with FIG. 11, (b) a controller, such as the controller 106 of FIG. 1, and/or (c) any other suitable device. The one or more programs may be embodied in software stored on a tangible medium such as, for example, a flash memory, a CD-ROM, a floppy disk, a hard drive, a DVD, or a memory associated with the processor 1112, but the entire program or programs and/or portions thereof could alternatively be executed by a device other than the microprocessor 1112 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually.

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. For example, blocks may be implemented as part of a mobility manager such as a mobility management entity of an LTE system or may be implemented as a part of a mobile station, etc. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Figure 2:
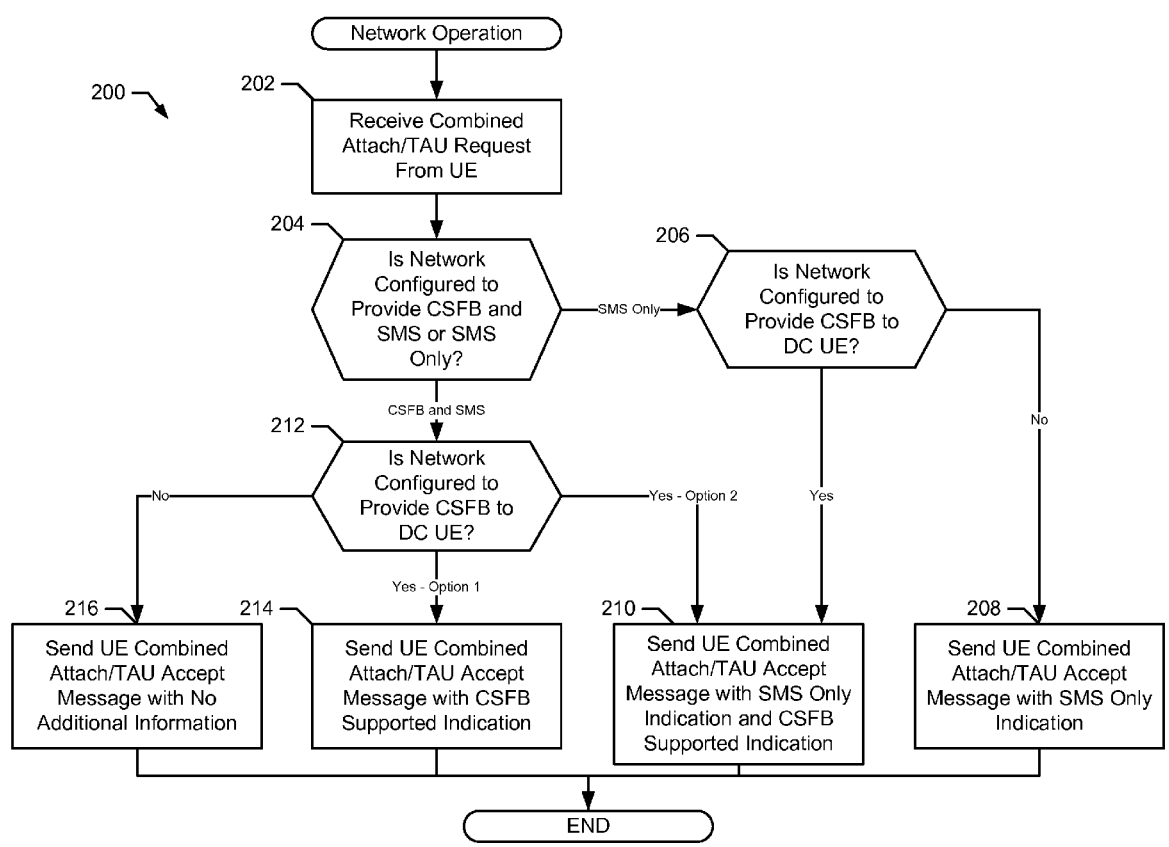
FIG. 2 is a flowchart of an example process that may be carried out at least partially by a communication network.

FIG. 2 is a flowchart of an example process 200 that may be carried out at least partially by the CM 156 of the communication network 104 in response to a combined Attach/TAU request from the UE 102. The process 200 results in sending Attach Accept messages with no additional information, with a CSFB Supported Indication only, with a CSFB Supported Indication and an SMS Only Indication, or only with an SMS Only Indication. Two options of process operation are described below. Of course, only one of these options may be implemented for the process 200 to be functional. In some example implementations, both options may be implemented and the communication network 104 may decide which option should be utilized.

The process 200 presumes that an Attach Accept will be granted in one of the specified forms. However, if a combined Attach/TAU (not for SMS only) fails and CSFB is not supported by a communication network, the UE verifies if it is VC or DC and if the UE is VC, it reselects to 2G/3G. Alternatively, if the UE is DC, it camps in LTE with neither CSFB nor SMS service. Similarly, if the communication network 104 is configured not to provide either CSFB service or SMS services to a VC or DC UE, and sends a Combined Attach/TAU Reject in response to a Combined Attach/TAU Request, the UE 102 verifies if it is VC or DC. If the UE is VC, it reselects to 2G/3G. If the UE is DC, it camps in LTE with neither CSFB nor SMS service.

The process 200 of FIG. 2 begins when the communication network 104 receives a combined Attach/TAU request from the UE 102 (block 202). The process 200 then determines whether the communication network 104 is configured to provide CSFB and SMS or SMS only to the UEs (block 204), e.g. based on network capability to support CSFB services, network policies regarding the support of CSFB services, or the UE 102 user profile or subscription. If the communication network 104 is configured to provide SMS only (block 204), the process 200 determines if the communication network 104 is configured to provide CSFB services to DC UEs (block 206).

If the communication network 104 is not configured to provide CSFB to DC UEs (block 206), the communication network 104 sends to the UE 102 a combined Attach/TAU accept message with an SMS Only Indication (block 208). As described below in conjunction with operation of the UE 102, upon receiving this attach response, a VC UE reselects to 2G/3G, and a DC UE camps in LTE and can receive/send using SMS but has no CSFB service (i.e., in case of incoming paging for mobile terminated CS services such as voice calls, the UE rejects the incoming paging and does not trigger mobile terminated (MT) CSFB procedures, and for mobile originated calls the UE does not attempt to establish the call and does not trigger mobile originated (MO) CSFB procedures).

By contrast, if the process 200 determines that the communication network is configured to provide CSFB services to DC UEs (block 206), the process 200 sends to the UE 102 a combined Attach/TAU accept message with an SMS Only Indication and a CSFB Supported Indication (block 210). This message is sent because the communication network 104 is configured to not provide CSFB service to a VC UE, but is configured to provide SMS service to a VC UE and/or CSFB and SMS service to a DC UE. As described below in conjunction with UE operation, a VC UEs may disregard the CSFB Supported Indication and behave as per regular except with SMS only (i.e., reselects to 2G/3G). By contrast, a DC UE camps in LTE and is aware that CSFB and SMS services are available through CSFB procedures (i.e., in case of incoming paging for mobile terminated calls the UE accepts the incoming paging and proceeds to trigger MT CSFB procedures, and for mobile originated calls the UE triggers MO CSFB procedures). The UE 102 also knows it needs to react to incoming paging for MT calls according to CSFB mechanisms instead of just disregarding them. In this arrangement, the MSC and MME act as if Combined Attach/TAU succeeded fully.

If the communication network 104 is configured to provide CSFB and SMS (block 204), the process 200 determines if the network is configured to provide CSFB to UEs configured as DC UEs (block 212). If the communication network is configured to provide CSFB to DC UEs and the communication network is utilizing a first option of operation (block 212), the process 200 sends to the UE 102 a combined Attach/TAU accept message only with a CSFB Supported Indication (block 214). According to the first option of operation, which applies to the idea that the network uses only the new CSFB Supported Indication to trigger VC UEs to reselect to 2G/3G, the communication network 104 is configured not to provide CSFB and SMS service if the UE 102 is a VC UE. That is, as described below with regard to operation of the UE 102, if the UE 102 is configured as a VC UE, the UE 102 will reselect to 2G/3G for all CS services. By contrast, the process of FIG. 2 is configured to provide CSFB and SMS service to the UE 102 if it is configured as a DC UE. This operation is desirable both to reduce call set up times for a VC UE and to enable CSFB service to a DC UE, for which the delay is acceptable by the operator. As explained below, the communication network 104 returns a Combined Attach/TAU Accept message containing the CSFB Supported Indication in response to a Combined Attach/TAU Request (not for SMS only). The operations, carried out as described in FIG. 2, allow the network to specify different UE behaviors depending on the UE voice/usage settings without the communication network 104 knowing the UE settings. That is, the communication network 104, in providing the CSFB Supported Indication, provides sufficient information to the UE 102 that will trigger expected behaviors based on the various settings in the UE 102.

As described below in conjunction with the UE 102 operation, upon receipt the Attach Accept sent by block 214, a VC UE seeing the CSFB Supported Indication considers the Combined Attach/TAU as failed and reselect to 2G/3G. Voice service and quality is important if the UE is VC, so the operator wants to give the UE the best voice (and other CS services) experience, even at the expense of data and, therefore requires the reselect. On the other hand, if the UE is DC, the operator wants still to give CSFB services and SMS to the DC UE, even if voice is not optimized. Thus, a DC UE camps in LTE and is aware that CSFB and SMS services are available through CSFB procedures (i.e., in case of incoming paging for mobile terminated calls the UE needs to trigger MT CSFB procedures, and for mobile originated calls the UE needs to trigger MO CSFB procedures) because the combined attach was accepted with the CSFB Supported indication. In this situation, the MSC and MME act as if Combined Attach/TAU succeeded fully.

If the communication network 104 is configured to provide CSFB to DC UEs and the communication network is utilizing a second option of operation (block 212), the process 200 sends to the UE 102 a combined ATTACH/TAU accept message with a CSFB Indication (block 210). According to the second option of operation, which applies to the idea that the communication network 104 uses both the SMS Only Indication and the new CSFB Supported Indication to trigger VC UEs to reselect to 2G/3G, by using the SMS Only Indication in addition to the CSFB Supported Indication, there is no impact of this idea on the VC UE. That is, the communication network 104 is configured to not provide CSFB and SMS service to a VC UE, but is configured to provide CSFB and SMS service to a DC UE. The communication network, therefore, returns a Combined Attach/TAU Accept message with the SMS Only Indication and containing the CSFB Supported Indication in response to a Combined Attach/TAU Request (not for SMS only). This Attach Accept message causes a VC UE to reselect to 2G/3G, but allows a DC UE to camp in LTE and be aware that CSFB and SMS services are available through CSFB procedures (i.e., in case of incoming paging for mobile terminated calls the UE needs to trigger MT CSFB procedures, and for mobile originated calls the UE needs to trigger MO CSFB procedures). The UE also knows it needs to react to incoming paging for MT calls according to CSFB mechanisms instead of just disregarding them. Note that this does not trigger a fallback for the UE to be able to receive the SMS. In the second option of operation, the MSC and MME act as if Combined Attach/TAU succeeded fully.

If the communication network 104 is not configured to provide CSFB (block 212), the process 200 sends a combined Attach/TAU accept message with no additional information appended thereto (block 216). This message means that the communication network 104 is configured to provide CSFB services and SMS service to the UE. Thus, as described below, the UE 102 camps in LTE and implements CSFB (i.e., incoming paging triggers CSFB; outgoing calls trigger CSFB) and does not check whether it is VC or DC.

Figure 3:
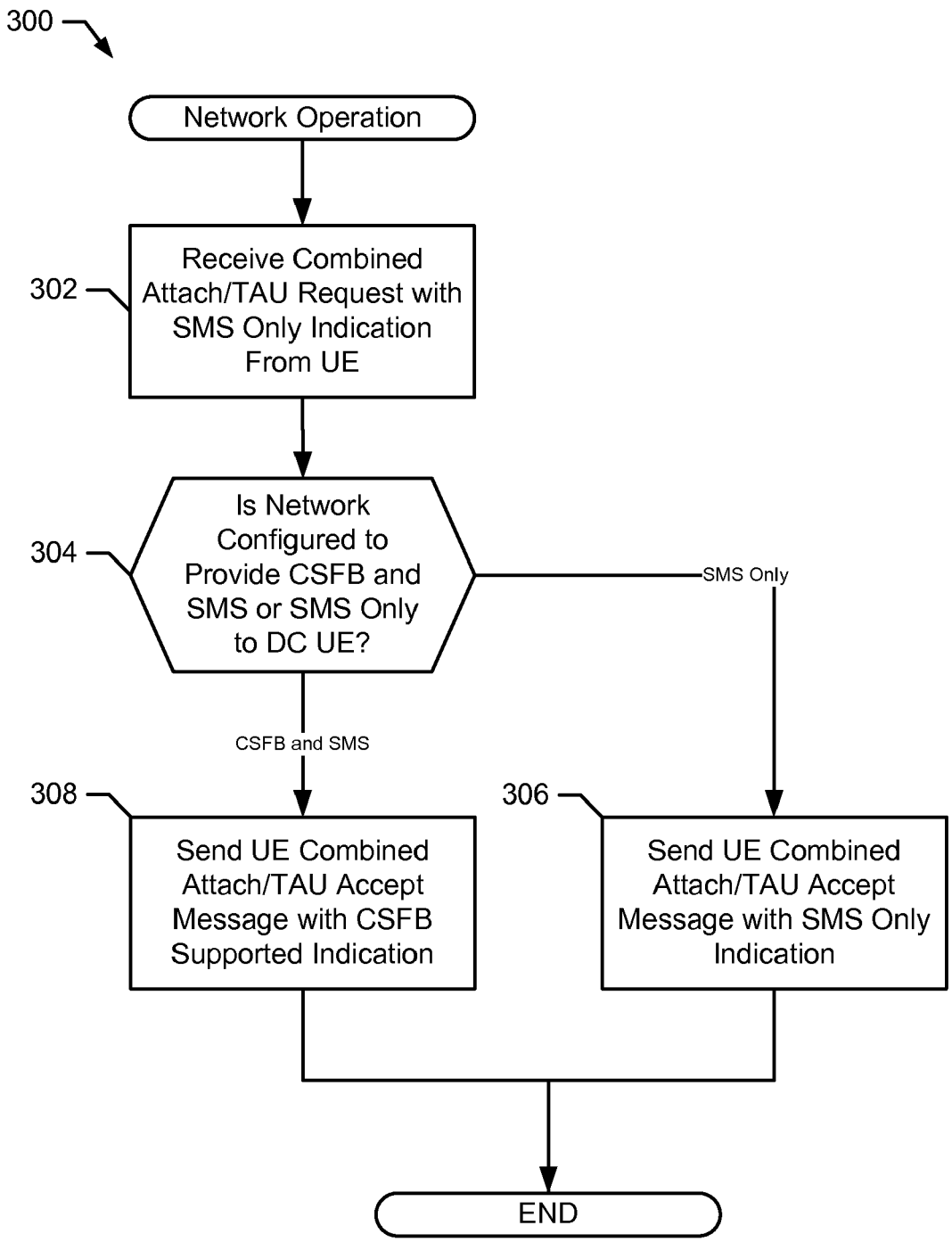
FIG. 3 is a flowchart of a second example process that may be carried out at least partially by a communication network.

FIG. 3 is a flowchart of an example process 300 that may be carried out at least partially by the CM 156 of the communication network 104 in response to a combined Attach/TAU request with an SMS Only Indication from the UE 102. The process 300 results in sending Attach Accept messages with a CSFB Supported Indication or an SMS Only Indication.

The process 300 of FIG. 3 begins when the communication network 104 receives a combined Attach/TAU request with an SMS Only Indication from the UE 102 (block 302). The process 200 then determines whether the communication network 104 is configured to provide CSFB and SMS, or SMS only to UEs configured as DC UEs (block 304). If the communication network 104 is configured to provide SMS only (block 304), the process 300 sends a combined Attach/TAU accept message with an SMS Only Indication to the UE 102 (block 306). As described below, upon receiving this attach response, a VC UE reselects to 2G/3G, and a DC UE camps in LTE and can receive/send using SMS but has no CSFB service (i.e., in case of incoming paging for mobile terminated CS services such as voice calls, the UE rejects the incoming paging and does not trigger MT CSFB procedures, and for mobile originated calls the UE does not attempt the establishment of the call and does not trigger MO CSFB procedures).

In contrast, if the process 300 determines that the communication network 104 is configured to provide CSFB and SMS to UEs configured as DC UEs (block 304), the process 300 sends a combined Attach/TAU accept message with an CSFB Supported Indication to the UE 102 (block 308). As described below in conjunction with UE operation, a VC UE may disregard the CSFB Supported Indication and behave as per regular except with SMS only (i.e., the VC UE reselects to 2G/3G). By contrast, a DC UE camps in LTE and is aware that CSFB and SMS services are available through CSFB procedures (i.e., in case of incoming paging for mobile terminated calls the UE accepts the incoming paging and proceeds to trigger MT CSFB procedures, and for mobile originated calls the UE triggers MO CSFB procedures). The UE 102 also knows it needs to react to incoming paging for MT calls according to CSFB mechanisms instead of just disregarding them. In this arrangement, the MSC and MME act as if Combined Attach/TAU succeeded fully.

Having described the operations that take place within the communications network 104 to satisfy attach requests made by the UE 102, the operation of the UE 102 and, in particular, how the UE 102 responds to different attach responses are described through the use of four use cases. The use cases are presented as processes represented by flowcharts.

Figure 4:
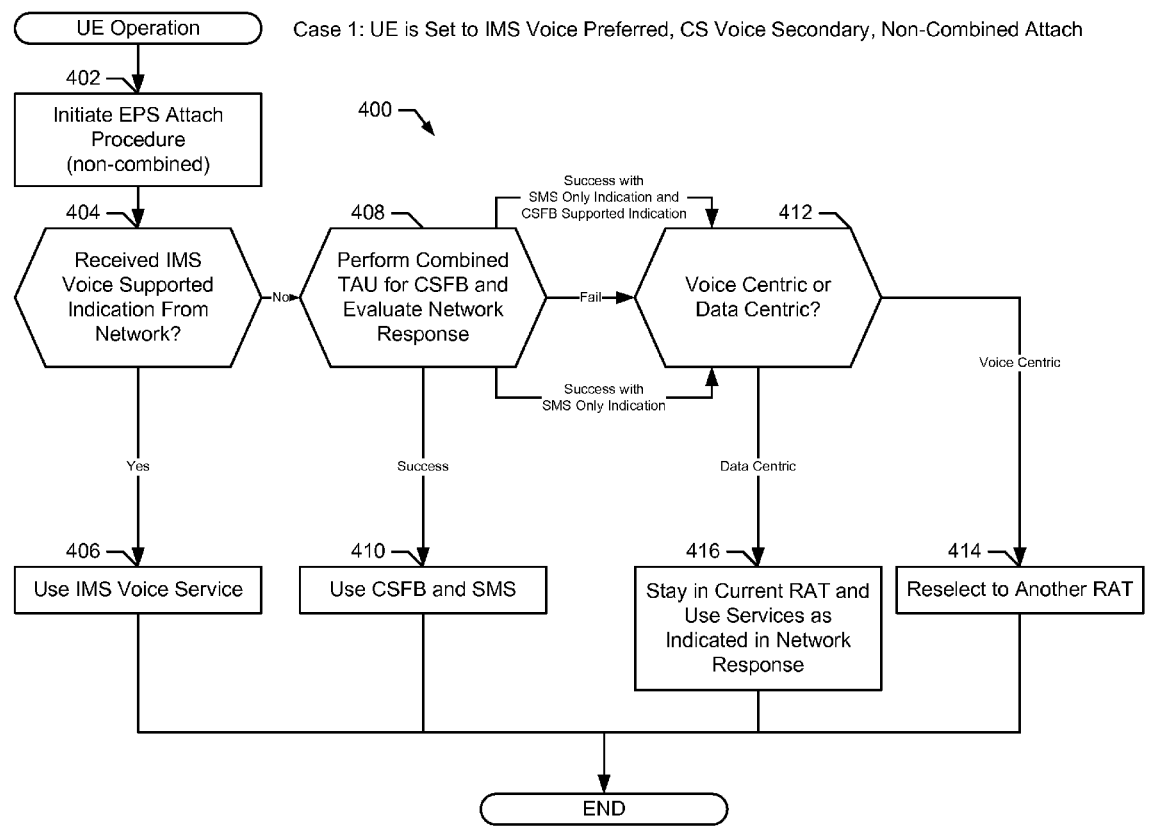
FIG. 4 is a flowchart of an example process that may be carried out to provision services to user equipment (UE).

The process 400 of FIG. 4 occurs when the UE 102 prefers voice service over an integrated messaging service (VoIMS) and secondarily prefers circuit switched (CS) voice services. The process 400 begins with the UE 102 initiating an EPS attach procedure, which is a non-combined attach related to PS services that is directed to the communication network 104 (block 402). The UE 102 receives a response from the communication network 104 and determines if the response indicated that VoIMS is supported by the communication network 104 (block 404). If VoIMS is supported (block 404), the UE 102 uses the IMS voice service to support voice communication (block 406).

If, however, the process 400 determines that VoIMS is not available from the communication network 104 (block 404), the process performs a combined TAU for CSFB and evaluates the response to the same that is made by the communication network (block 408). If the response from the communication network 104 indicates that the combined TAU was successful, the UE 102 uses CSFB and SMS to support voice communication (block 410). In contrast, if the response from the communication network 104 indicates that the TAU was a failure, or was successful with an SMS Only Indication and a CSFB Supported Indication, or was successful with only an SMS Only Indication (block 408), the process 400 determines whether the UE 102 is operating in a voice centric or data centric usage setting (block 412).

If the usage setting is voice centric (block 412), the UE 102 reselects to another RAT because the voice services provided by the CSFB will likely not provide an optimal user experience for a VC UE (block 414). Accordingly, the UE 102 will connect to, for example, a 2G or 3G network such as, for example, a GERAN or UTRAN. The UE 102 may additionally disable the E-UTRAN capability. Additionally, in some implementations, if the UE is in the EPS mobility management (EMM)-CONNECTED mode, the UE shall locally release the established non-access stratum (NAS) signaling connection and enter the EMM-IDLE mode before selecting GERAN or UTRAN radio access technology. In contrast, if the usage setting of the UE 102 is data centric (block 412), the UE 102 stays in the current RAT because there is a connection with LTE due to the successful EPS attach, and uses the CS services as indicated in the network response (e.g., SMS only or both SMS and CSFB services are available) (block 416) because there is a successful IMSI attach.

Thus, if the UE 102 received an indication in the network response that SMS only is supported upon receiving this attach response, a VC UE reselects to 2G/3G, and a DC UE camps in LTE and can receive/send using SMS but has no CSFB service (i.e., in case of incoming paging for mobile terminated CS services such as voice calls, the UE rejects the incoming paging and does not trigger MT CSFB procedures, and for mobile originated calls the UE does not attempt the establishment of the call and does not trigger MO CSFB procedures). By contrast, the UE 102 received an indication that both CSFB and SMS services are supported, a VC UE may disregard the CSFB Supported Indication and behave as per regular except with SMS only (i.e., reselects to 2G/3G), whereas a DC UE camps in LTE and is aware that CSFB and SMS services are available through CSFB procedures (i.e., in case of incoming paging for mobile terminated calls the UE accepts the incoming paging and proceeds to trigger MT CSFB procedures, and for mobile originated calls the UE triggers MO CSFB procedures). The UE 102 also knows it needs to react to incoming paging for MT calls according to CSFB mechanisms instead of just disregarding them. In this arrangement, the MSC and MME act as if Combined Attach/TAU succeeded fully.

Figure 5:
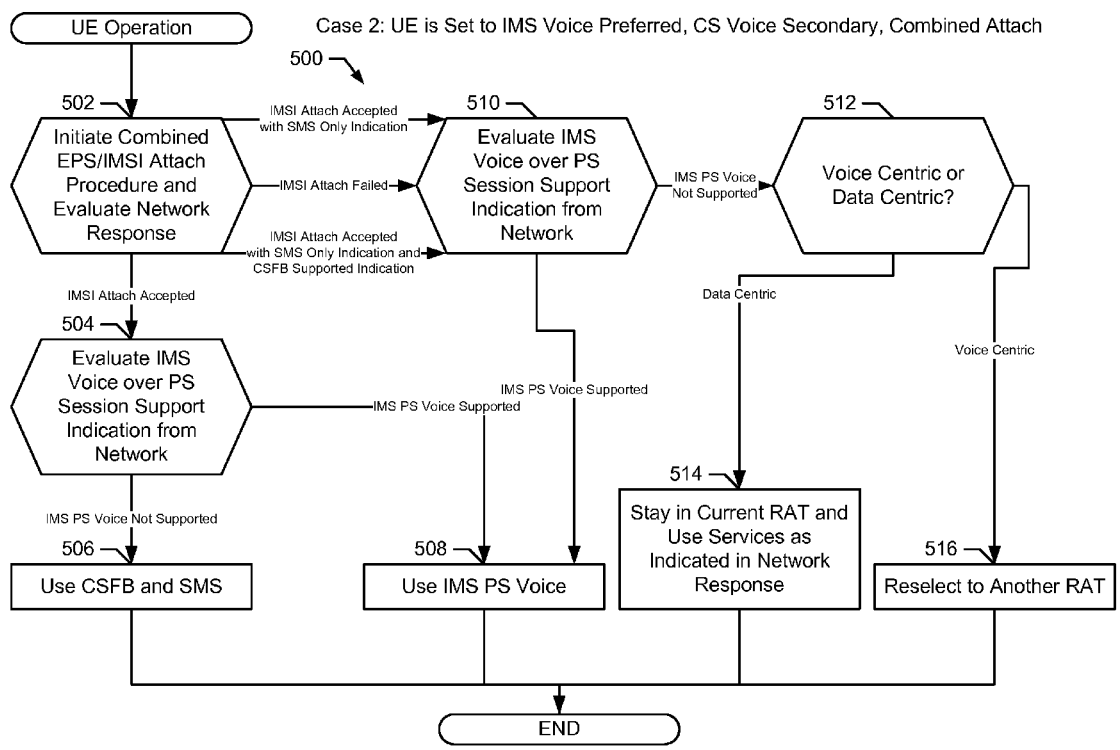
FIG. 5 is a flowchart of a second example process that may be carried out to provision services to UE.

The process 500 of FIG. 5 occurs when the UE 102 prefers VoIMS, secondarily prefers circuit switched (CS) voice, and executes a combined attach. The process 500 begins with the UE 102 initiating a combined EPS/IMSI attach procedure and evaluating the response the UE 102 receives from the communication network 104 (block 502). If the IMSI attach was accepted (block 502), the process 500 evaluates whether VoIMS is supported (block 504). If VoIMS is not supported (block 504), the UE 102 obtains voice services through the CSFB and SMS systems. In other words, because the UE 102 cannot obtain voice services using VoIMS, which is its primary preference, the UE 102 obtains voice services through its secondary preference: CSFB. If, however, VoIMS is available (block 504), the UE 102 uses VoIMS to obtain voice services (block 508).

However, if the IMSI attach failed, was accepted with an SMS Only Indication, or was accepted with an SMS Only Indication and a CSFB Supported Indication (block 502), the process 500 evaluates whether VoIMS is available (block 510). If VoIMS is supported (block 510), the UE 102 uses VoIMS to obtain voice services (block 508). If VoIMS is not supported (block 510), the process 500 determines whether the UE 102 is in a voice centric or data centric usage state (block 512).

If the UE 102 is in a data centric usage state (e.g., the UE 102 is a DC UE) (block 512), the UE 102 stay in the current RAT and uses the services indicated by the network response (block 514). As shown in the flow chart between blocks 502 and 510, such indications may be that only SMS is available (in the case of an SMS Only Indication), both SMS and CSFB are available (in the case of an SMS Only Indication and a CSFB Supported Indication), or that no CS services are available at all (in the case of an IMSI attach fail). Thus, a DC UE will remain camped on LTE and have some CS services, no CS services, or all CS services. For example, if the UE 102 received an indication in the network response that SMS only is supported upon receiving this attach response, a DC UE camps in LTE and can receive/send using SMS but has no CSFB service (i.e., in case of incoming paging for mobile terminated CS services such as voice calls, the UE rejects the incoming paging and does not trigger MT CSFB procedures, and for mobile originated calls the UE does not attempt the establishment of the call and does not trigger MO CSFB procedures). If the UE 102 received an indication that both CSFB and SMS services are supported, a DC UE camps in LTE and is aware that CSFB and SMS services are available through CSFB procedures (i.e., in case of incoming paging for mobile terminated calls the UE accepts the incoming paging and proceeds to trigger MT CSFB procedures, and for mobile originated calls the UE triggers MO CSFB procedures). The UE 102 also knows it needs to react to incoming paging for MT calls according to CSFB mechanisms instead of just disregarding them. In this arrangement, the MSC and MME act as if Combined Attach/TAU succeeded fully.

By contrast, if the process 500 determines that the UE 102 is a voice centric UE (e.g., a VC UE) (block 512), the UE 102 selects another RAT (block 516). That is, the response from the communication network 104 was such that only CSFB services are available and such services are not optimal for VC UEs. Thus, the VC UE will reselect to another RAT having more optimal voice services. For example, if the UE 102 received an indication in the network response that SMS only is supported upon receiving this attach response, a VC UE reselects to 2G/3G such as, for example, a GERAN or UTRAN. As a further example, if the UE 102 received an indication that both CSFB and SMS services are supported, a VC UE may disregard the CSFB Supported Indication and behave as per regular except with SMS only (i.e., reselect to 2G/3G). The UE 102 may additionally disable the E-UTRAN capability. Additionally, in some implementations, if the UE is in the EMM-CONNECTED mode, the UE shall locally release the established NAS signaling connection and enter the EMM-IDLE mode before selecting GERAN or UTRAN radio access technology.

Figure 6:
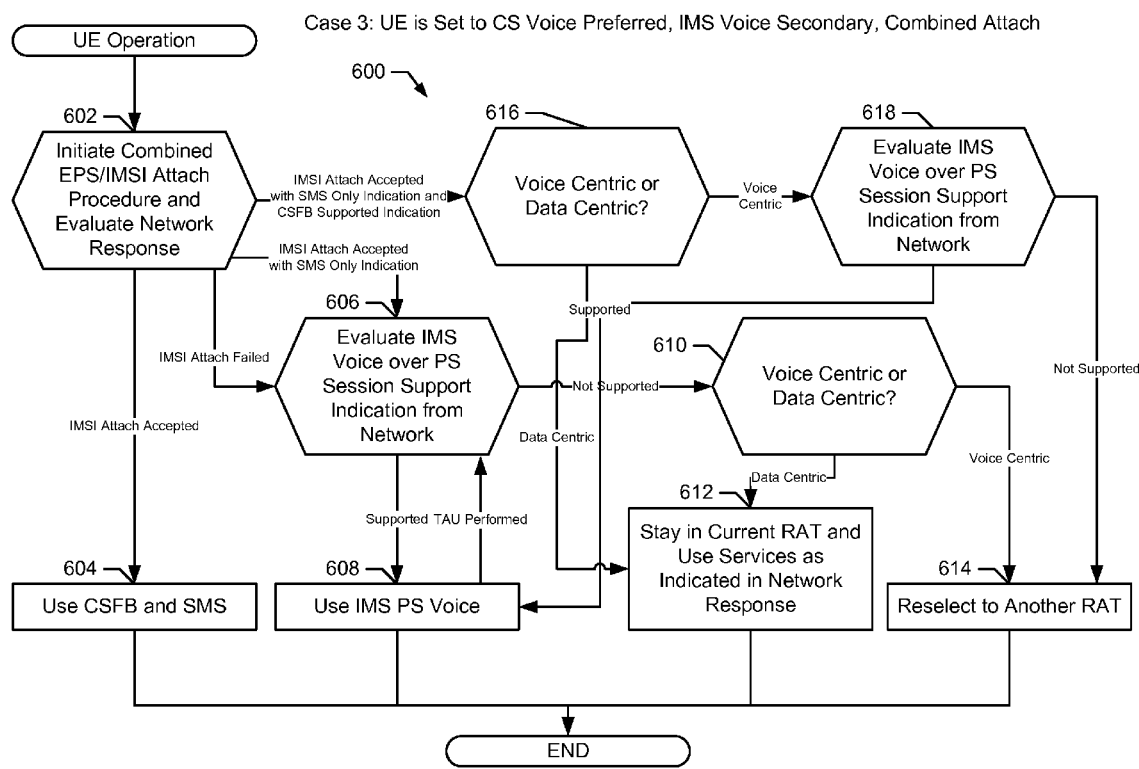
FIG. 6 is a flowchart of a third example process that may be carried out to provision services to UE.

The process 600 of FIG. 6 occurs when the UE 102 prefers circuit switched (CS) voice, secondarily prefers VoIMS, and executes a combined attach. The process 600 begins with the UE 102 initiating a combined EPS/IMSI attach procedure and evaluating the response the UE 102 receives from the communication network 104 (block 602). If the IMSI attach was accepted (block 602), the UE 102 uses CSFB and SMS services that are provided by the CS IMSI services (block 604) because those services are primarily preferred.

However, if the IMSI attach was not accepted (i.e., failed) or was accepted with an SMS Only Indication (block 602), the process 500 evaluates whether VoIMS is available (block 606). If VoIMS is supported (block 606), the UE 102 uses VoIMS to obtain voice services (block 608). This selection of voice services is made because the primarily preferred CS voice services are not available and, therefore, the secondarily preferred VoIMS services are used. If VoIMS is not supported (block 606), the process 600 determines whether the UE 102 is in a voice centric or data centric usage state (block 610).

If the UE 102 is in a data centric usage state (block 610), the UE 102 stays in communication with the current RAT and uses the services indicated in the network response (e.g., no CS services, CS services with SMS only, or CS services with SMS and CSBF) (block 612). For example, if the UE 102 received an indication in the network response that SMS only is supported upon receiving this attach response, a DC UE camps in LTE and can receive/send using SMS but has no CSFB service (i.e., in case of incoming paging for mobile terminated CS services such as voice calls, the UE rejects the incoming paging and does not trigger MT CSFB procedures, and for mobile originated calls the UE does not attempt the establishment of the call and does not trigger MO CSFB procedures). If the UE 102 received an indication that both CSFB and SMS services are supported, a DC UE camps in LTE and is aware that CSFB and SMS services are available through CSFB procedures (i.e., in case of incoming paging for mobile terminated calls the UE accepts the incoming paging and proceeds to trigger MT CSFB procedures, and for mobile originated calls the UE triggers MO CSFB procedures). The UE 102 also knows it needs to react to incoming paging for MT calls according to CSFB mechanisms instead of just disregarding them. In this arrangement, the MSC and MME act as if Combined Attach/TAU succeeded fully.

If, however, the UE 102 is a VC UE (block 610), the UE 102 reselects to another RAT to obtain more optimal voice services (block 614). For example, if the UE 102 received an indication in the network response that SMS only is supported upon receiving this attach response, a VC UE reselects to 2G/3G. As a further example, if the UE 102 received an indication that both CSFB and SMS services are supported, a VC UE may disregard the CSFB Supported Indication and behave as per regular except with SMS only (i.e., reselect to 2G/3G).

Returning to the evaluation performed by block 602, if the IMSI attach is accepted with an SMS Only Indication and a CSFB Supported Indication (block 602), the process 600 determines if the UE 102 usage is voice centric or data centric (block 616). If the UE 102 is a data centric UE, the UE 102 stays in communication with the current RAT and uses the services indicated in the network response (e.g., CS services with SMS and CSBF) (block 612).

Alternatively, if the UE 102 is voice centric (block 616), the process 600 determines whether VoIMS is supported (block 618). If VoIMS is supported (block 608), the UE 102 uses VoIMS (block 608). Thus, the secondarily preferred VoIMS service is used. Alternatively, if VoIMS is not supported (block 618), the UE 102 reselect to another RAT (block 614).

Figure 7:
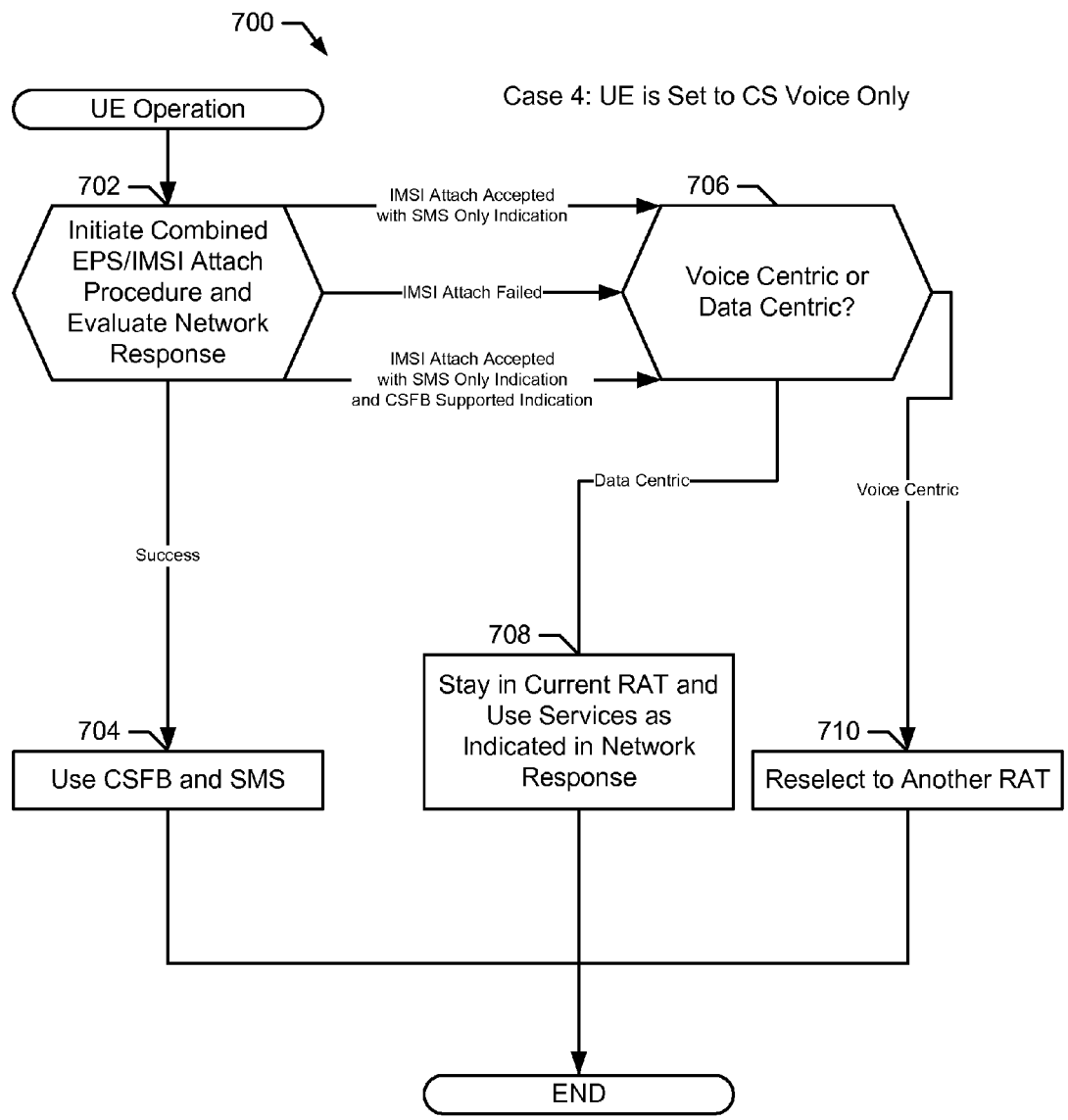
FIG. 7 is a flowchart of a fourth example process that may be carried out to provision services to UE.

The process 700 of FIG. 7 occurs when the UE 102 prefers circuit switched (CS) voice only, meaning that the UE 102 has no secondary preference, and executes a combined attach. The process 700 begins with the UE 102 initiating a combined EPS/IMSI attach procedure and evaluating the response the UE 102 receives from the communication network 104 (block 702). If the IMSI attach was successful (block 702), the UE 102 uses CSFB and SMS services that are provided by the CS IMSI services (block 704) because those services are the only services preferred.

However, if the IMSI attach was not successful (i.e., failed), or was accepted with an SMS Only Indication, or was accepted with an SMS Only Indication and a CSFB Supported Indication (block 702), the process 700 evaluates whether the UE 102 has a usage preference of voice centric or data centric (block 706). If the UE 102 is a DC UE, the UE stays in its current RAT (i.e., camped on LTE) and uses the services indicated in the IMSI attach response, which may range from no CS services at all to CS services with CSFB and SMS (block 708). For example, if the UE 102 received an indication in the network response that SMS only is supported upon receiving this attach response, a DC UE camps in LTE and can receive/send using SMS but has no CSFB service (i.e., in case of incoming paging for mobile terminated CS services such as voice calls, the UE rejects the incoming paging and does not trigger MT CSFB procedures, and for mobile originated calls the UE does not attempt the establishment of the call and does not trigger MO CSFB procedures). If the UE 102 received an indication that both CSFB and SMS services are supported, a DC UE camps in LTE and is aware that CSFB and SMS services are available through CSFB procedures (i.e., in case of incoming paging for mobile terminated calls the UE accepts the incoming paging and proceeds to trigger MT CSFB procedures, and for mobile originated calls the UE triggers MO CSFB procedures). The UE 102 also knows it needs to react to incoming paging for MT calls according to CSFB mechanisms instead of just disregarding them. In this arrangement, the MSC and MME act as if Combined Attach/TAU succeeded fully.

If the UE 102 is a VC UE, the UE 102 reselects to another RAT to obtain voice services from a CS provider (block 710). For example, if the UE 102 received an indication in the network response that SMS only is supported upon receiving this attach response, a VC UE reselects to 2G/3G. As a further example, if the UE 102 received an indication that both CSFB and SMS services are supported, a VC UE may disregard the CSFB Supported Indication and behave as per regular except with SMS only (i.e., reselect to 2G/3G).

Figure 8:
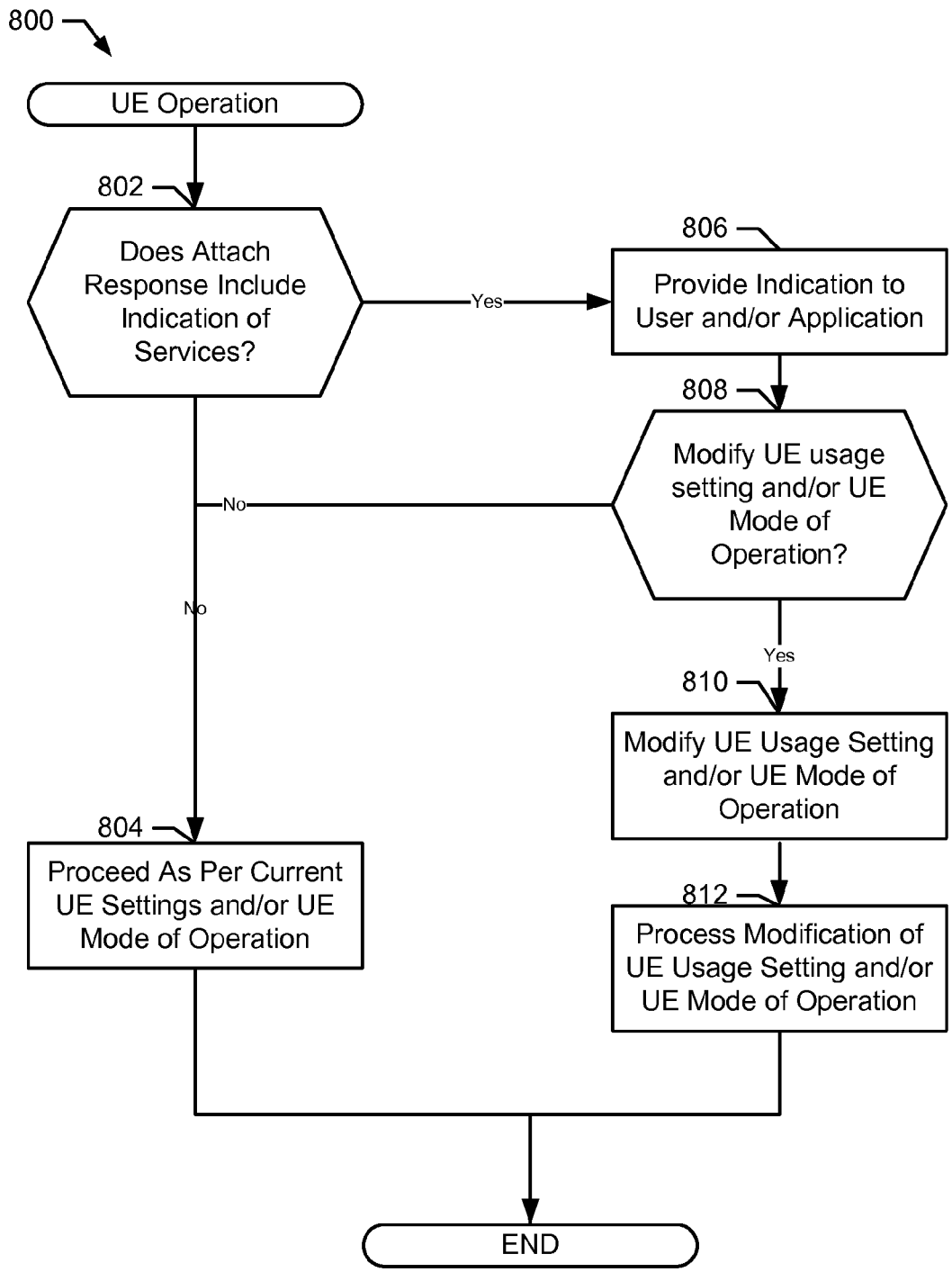
FIG. 8 is a flowchart of an example process that may be carried out to modify usage settings in UE.

Turning now to the example of FIG. 8, upon receiving a CSFB Supported Indication as described above, the result of the combined attach/TAU procedure is provided to either the user or the applications or both in the UE 102. This may happen before the UE verifies the current UE usage setting (e.g., VC or DC, which indicate whether the UE is a VC UE or a DC UE) and/or UE mode of operation, which may have values of CS/PS UE mode 1 and CS/PS UE mode 1, and decides whether to reselect to other RAT or stay in the current RAT, or after the UE has performed such actions. This happens both when the UE is provided with an SMS Only Indication and the UE is provided with the CSFB Supported Indication. By providing such information, either the user or the applications or both are aware of the services available and in reaction may decide to change the UE usage setting (e.g., change between voice centric and data centric) and/or UE mode of operation (e.g. change between CS/PS UE mode 1 and CS/PS UE mode 1) to take advantage of the services available. As an example, upon receiving the CSFB Supported Indication, a VC UE may provide either the user or the application or both the CSFB Supported Indication, and the VC UE may decide to switch the usage setting to DC and/or UE mode of operation (e.g. from CS/PS UE mode 1 to CS/PS UE mode 2 or vice versa) in order to be able to camp in the LTE coverage and take advantage of the higher data rates for PS services while still being capable of using SMS and CSFB services. A description of an example process 800 follows.

The process 800 begins by determining whether the attach response received at the UE 102 from the communication network 104 includes an indication of services (e.g., SMS, CSFB, etc.) (block 802). If no service indications have been received, the UE 102 proceed per the UE usage settings (block 804). Alternatively, if the attach response included an indication of services (block 802), the process 800 provides an indication of such services to one or more of a user of the UE 102 and applications running on the UE 102 (block 806). The process 800 then determines whether the user or the applications or both require a change of the usage settings and/or UE mode of operation (block 808). If the usage settings and/or UE mode of operation do not need to be modified (block 808), the process 800 proceeds as per the current UE usage settings and/or UE mode of operation (block 804). If, however, the usage setting and/or UE mode of operation needs to be modified (block 808), the process 800 modifies the usage setting and/or UE mode of operation by, for example, writing a new usage setting into memory (block 810).

After the usage setting and/or UE mode of operation have been modified (block 810), the modified usage setting and/or UE mode of operation are processed by the UE 102 (block 812). The UE 102 may process the modification in one of a number of possible ways. For example, if the indication has been provided to the user/application before the UE 102 performs the UE usage checking (e.g., checking the UE mode of operation between CS/PS mode 1 and CS/PS mode 2) as described above, then the UE 102 proceeds with verifying the UE usage setting using the modified UE usage setting and/or UE mode of operation. If the indication has been provided to the user/application after the UE 102 performs the UE usage checking and selects which RAT to use, the UE 102 may either reboot and reattach to the network, or detach and reattach to the network, or perform an additional EPS/IMSI TAU procedure.

Figure 9:
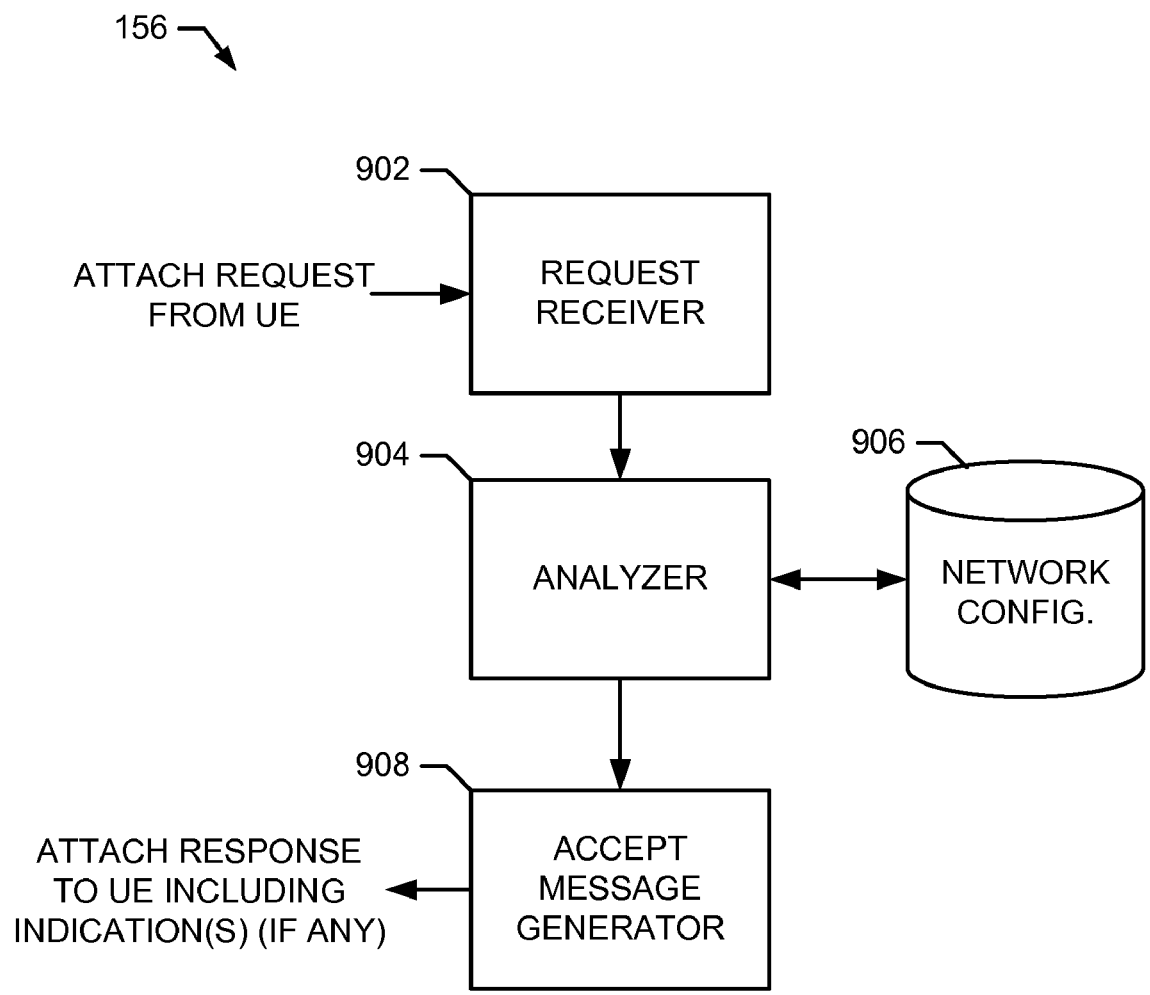
FIG. 9 is a block diagram of an example connection manager of the communication network of FIG. 1.

A block diagram of an example connection manager 156 is shown in FIG. 9. As described above, the connection manager 156 may be configured to facilitate the processes described above in conjunction with the communications network 104. In one example, the connection manager 156 may provide one or more indications (e.g., a CSFB Supported Indication, an SMS Only Indication, etc.) that are used by UEs to select services. The connection manager 156 may be implemented using hardware, software, or any combination thereof. For example, the connection manager 156 may be implemented using the system described below in conjunction with FIG. 11.

In the example of FIG. 9, the connection manager includes a request receiver 902 to receive attach requests from the UE 102. After their receipt, the requests are passed to an analyzer 904, which is communicatively coupled to a network configuration information store 906. The analyzer 904 determines the response that will be made to attach requests and uses information, such as whether CSFB and/or SMS (or any other CS facilities) are available and should be used by DC UE. The analyzer 904 may carry out all or portions of the processing or operations described above in conjunction with FIGS. 2 and 3, utilizing information from the network configuration information store 906, as needed.

The results of the analysis are provided to an accept message generator 908, which formulates an attach response for transmittal to the requesting UE. As described above, the attach response may include an indication of services available to the UE (e.g., SMS only, CSFB, etc.).

Figure 10:
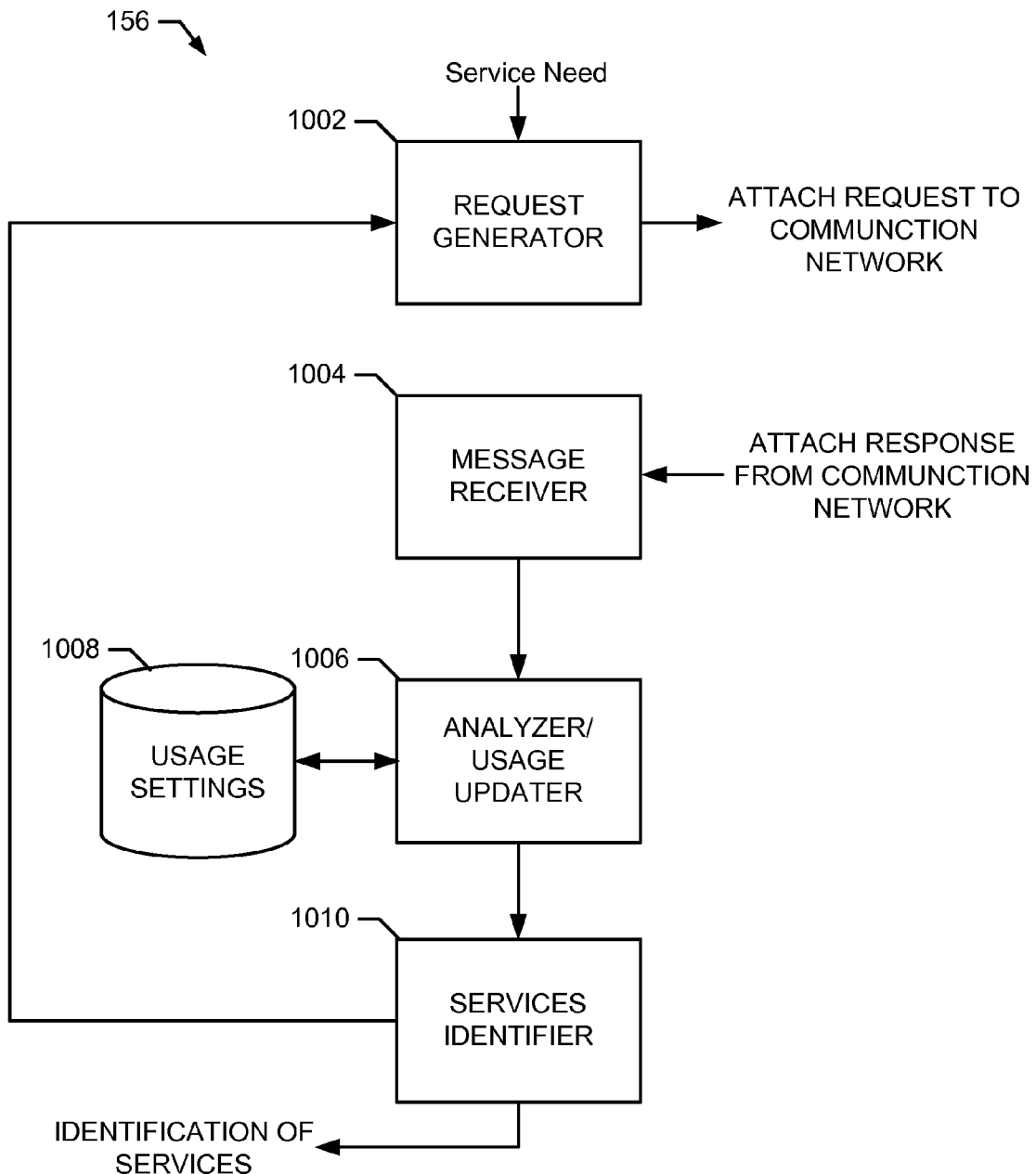
FIG. 10 is a block diagram of an example voice support manager (VSM) of the UE of FIG. 1.

A block diagram of an example VSM 107 is shown in FIG. 10. As described above, the VSM may be configured to facilitate the processing performed by the UE 102. The VSM 107 may be implemented using hardware, software, or any combination thereof. For example, the VSM 107 may be implemented using the system described below in conjunction with FIG. 11.

In the example of FIG. 10, the VSM 156 includes a request generator 1002 that generates attach requests in response to service needs indicated by other facilities within the UE 102. The attach requests may be non-combined requests for services (e.g., requests for either CS services or PS services) or may be combined requests (e.g., requests to access both PS and CS services).

A message receiver 1004 receives attach responses from the communication network and passes them to an analyzer/usage updater 1006, which is in communication with a usage settings data store 1008. The analyzer/usage updater 1006 determines the services that will be used by the UE 102 based on the attach responses. The analyzer/usage updater 1006 may carry out the processing described above in conjunction with FIGS. 4-7, utilizing the usage settings found in the usage settings data store 1008, as needed. Additionally, the analyzer/usage updater 1006 may perform updating of the usage settings in the usage settings data store 1008, as described above in conjunction with FIG. 8.

The analyzer/usage updater 1006 provides to a services identifier 1010 the services that are available and the services identifier 1010 makes those services known to the relevant portions and processes of the UE 102 through a service identification message. Additionally, in the event that no services are available, the services identifier 1010 may inform the request generator 1002 of the same and the request generator 1002 may then attempt to access a different RAT.

Figure 11:
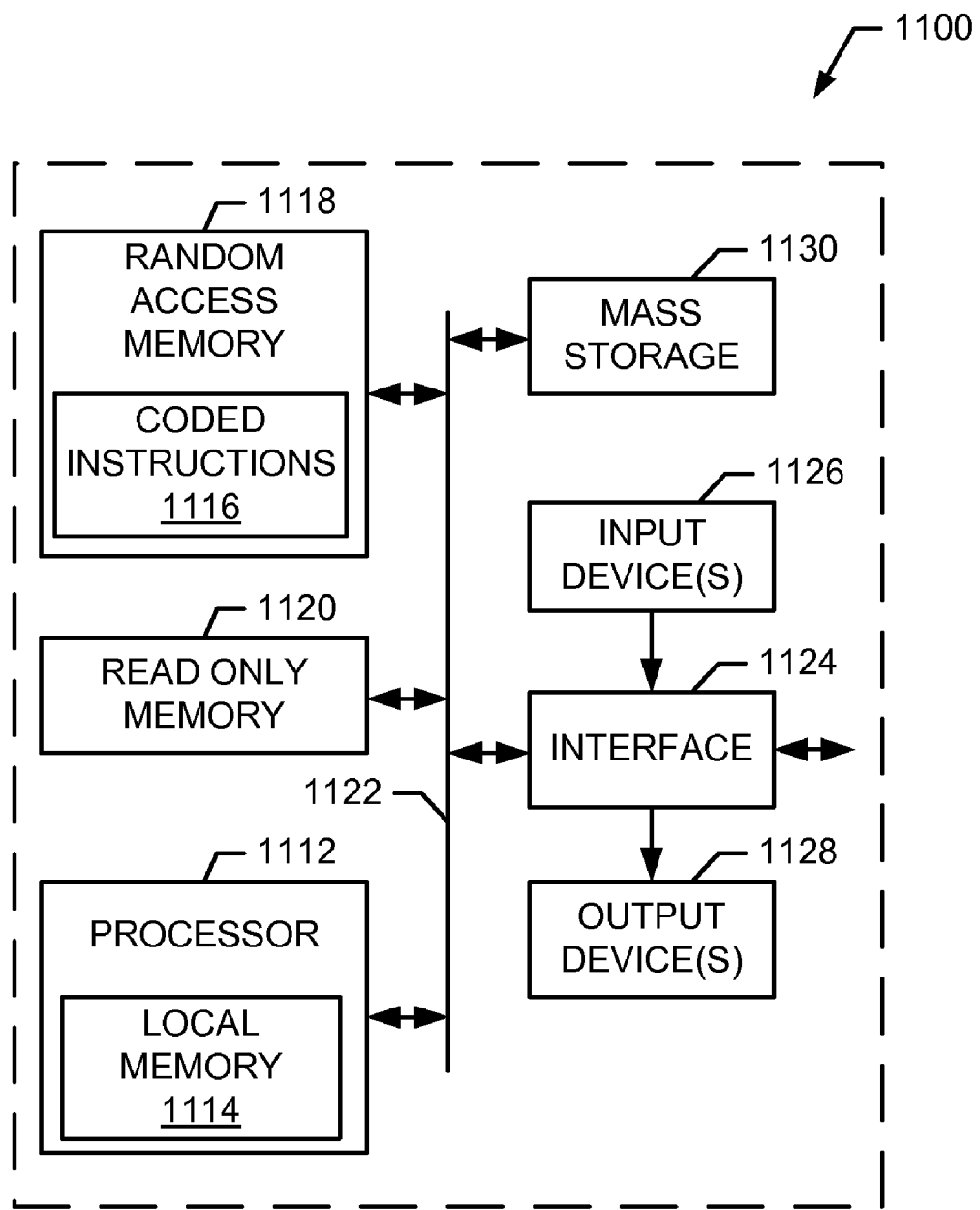
FIG. 11 is a block diagram of an example processing system capable of implementing the apparatus and methods disclosed herein.

FIG. 11 is a block diagram of an example processing system 1100 capable of implementing the apparatus and methods disclosed herein. The processing system 1100 can correspond to, for example, a mobile station processing platform, a network element processing platform, a server, a personal computer, a personal digital assistant (PDA), an Internet appliance, a mobile phone, or any other type of computing device. For example the processing system 1100 may implement the UE 102 and any component of the mobile communication networks 104.

The system 1100 of the instant example includes a processor 1112 such as a general purpose programmable processor, an embedded processor, a microcontroller, etc. The processor 1112 includes a local memory 1114, and executes coded instructions 1116 present in the local memory 1114 and/or in another memory device. The processor 1112 may execute, among other things, machine readable instructions to implement the processes represented in the drawings described above. The processor 1112 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 1112 is in communication with a main memory including a volatile memory 1118 and a non-volatile memory 1120 via a bus 1122. The volatile memory 2118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The system 1100 also includes an interface circuit 1124. The interface circuit 1124 may be implemented by any type of interface standard, such as an Ethernet interface, a universal serial bus (USB), and/or a third generation input/output (3GIO) interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the system 1100 also includes one or more mass storage devices 1130 for storing software and data. Examples of such mass storage devices 1130 include floppy disk drives, hard drive disks, compact disk drives and digital versatile disk (DVD) drives.

As an alternative to implementing the methods and/or apparatus described herein in a system such as the device of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this disclosure is not limited thereto. On the contrary, this disclosure covers all methods, apparatus and articles of manufacture fairly falling within the scope of the appended claims either literally or under the doctrine of equivalents.

What is claimed is:

1. A method for a user equipment, the method comprising:
   sending a request message for a combined registration via a first radio access technology of a network;
   receiving a registration accept message having an information element with a value that indicates that circuit switched fall back (CSFB) is available for voice services; and
   responsive to said receiving,
      if the user equipment has a voice centric usage setting, reselecting to a second radio access technology, and
      if the user equipment has a data centric usage setting, remaining in the first radio access technology for which the UE can use of CSFB for voice services.

2. The method as defined in claim 1, when the user equipment has the data centric usage setting, after said remaining in the first radio access technology, the method further comprising:
   performing CSFB to the second radio access technology in response to a mobile originated call or incoming paging for a mobile terminated call.

3. The method as defined in claim 1, wherein the combined registration request message is also for at least one non-EPS service.

4. The method as defined in claim 1, wherein the value that indicates that CSFB is available for voice services indicates to the user equipment (UE) that data centric UEs are allowed to use CSFB for voice service and voice centric UEs are not allowed to use CSFB for voice service.

5. The method as defined in claim 1, wherein the first radio access technology is evolved universal mobile telecommunications system (UMTS) radio access network (E-UTRAN).

6. The method as defined in claim 1, wherein the second radio access technology is at least one of universal mobile telecommunications systems (UMTS) radio access network (UTRAN) or global system for mobile communications (GSM) enhanced data rates for GSM evolution (EDGE) radio access network (GERAN).

7. The method as defined in claim 1, wherein the combined registration request message is at least one of an ATTACH request message or a TRACKING AREA UPDATE request message and wherein the combined registration request message includes an indication that it is a combined registration request.

8. A user equipment comprising:
   a request generator to send a request message for a combined registration via a first radio access technology of a network;
   a message receiver to receive a registration accept message having an information element with a value that indicates that circuit switched fall back (CSFB) is available for voice services; and
   a services identifier to, response to said receiving by the message receiver, if the user equipment has a voice centric usage setting, cause the user equipment to reselect to a second radio access technology, and if the user equipment has a data centric usage setting, cause the user equipment to remain in the first radio access technology for which the UE can use CSFB for voice services.

9. The user equipment as defined in claim 8, further comprising an analyzer/usage updater to determine that the user equipment has the voice centric usage setting.

10. The user equipment as defined in claim 8, wherein the request message for a combined registration is also for at least one non-EPS service.

11. The user equipment as defined in claim 8, wherein the indicator is at least one of an indication that CSFB is not preferred or SMS only.

12. A computer readable memory comprising instructions that, when executed, cause a machine to:

send a request message for a combined registration via a first radio access technology of a network;

receive a registration accept message having an information element with a value that indicates that circuit switched fall back (CSFB) is available for voice services; and responsive to said receiving, if the user equipment has a voice centric usage setting, reselect to a second radio access technology, and if the user equipment has a data centric usage setting, remain in the first radio access technology for which the UE can use CSFB for voice services.

13. The computer readable medium as defined in claim 12, if the user equipment has the data centric usage setting, after said remaining in the first radio access technology, the instructions, when executed, further cause the machine to:

perform CSFB to the second radio access technology in response to a mobile originated call or incoming paging for a mobile terminated call.

14. The computer readable memory as defined in claim 12, wherein the combined registration request message is also for at least one non-EPS service.

15. The computer readable memory as defined in claim 12, wherein the value that indicates that CSFB is available for voice services indicates to the user equipment (UE) that data centric UEs are allowed to use CSFB for voice service and voice centric UEs are not allowed to use CSFB for voice service.

16. The computer readable memory as defined in claim 12, wherein the first radio access technology is evolved universal mobile telecommunications system (UMTS) radio access network (E-UTRAN).

17. The computer readable memory as defined in claim 12, wherein the second radio access technology is at least one of universal mobile telecommunications system (UMTS) radio access network (UTRAN) or global system for mobile communications (GSM) enhanced data rates for GSM evolution (EDGE) radio access network (GERAN).

18. The computer readable memory as defined in claim 12, wherein the combined registration request message is at least one of an ATTACH request message or a TRACKING AREA UPDATE request message and wherein the combined registration request message includes an indication that it is a combined registration request.

* * * * *

UNITED STATES PATENT AND TRADEMARK OFFICE
CERTIFICATE OF CORRECTION

PATENT NO. : 8,369,253 B2
APPLICATION NO. : 12/856270
DATED : February 5, 2013
INVENTOR(S) : Stefano Faccin et al.

It is certified that error appears in the above-identified patent and that said Letters Patent is hereby corrected as shown below:

In the Claims

Column 25, line 31: replace "medium" with --memory--.

Signed and Sealed this
Twenty-first Day of May, 2013

Teresa Stanek Rea
*Acting Director of the United States Patent and Trademark Office*